(12) United States Patent
Yano

(10) Patent No.: US 6,249,380 B1
(45) Date of Patent: Jun. 19, 2001

(54) IMAGE-BLUR CORRECTING OPTICAL SYSTEM FOR A VIEWING OPTICAL APPARATUS

(75) Inventor: Takaaki Yano, Hokkaido (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/592,951

(22) Filed: Jun. 13, 2000

(30) Foreign Application Priority Data

Jun. 14, 1999 (JP) .................................................. 11-166501

(51) Int. Cl.[7] .............................. G02B 27/64; G02B 23/00
(52) U.S. Cl. ........................ 359/557; 359/407; 359/431; 359/554
(58) Field of Search ..................................... 359/407–409, 359/421–423, 431–432, 554–557, 676–684, 689–692; 396/52–55, 373–386; 348/208

(56) References Cited

U.S. PATENT DOCUMENTS

| | | | |
|---|---|---|---|
| 5,917,653 | * 6/1999 | Taniguchi | 359/557 |
| 6,046,853 | 4/2000 | Yano | 359/557 |
| 6,072,630 | 6/2000 | Yano | 359/557 |
| 6,118,585 | * 9/2000 | Kanai | 359/557 |

FOREIGN PATENT DOCUMENTS 10186228   7/1998   (JP) .

* cited by examiner

Primary Examiner—Thong Nguyen
(74) Attorney, Agent, or Firm—Greenblum & Bernstein P.L.C.

(57) ABSTRACT

An image-blur correcting optical system includes a positive blur-correcting lens group constituted by the rear lens group which is arranged to move in a direction perpendicular to the optical axis, in accordance with the magnitude of a shake imposed on the optical system. The image-blur correcting optical system satisfies the following conditions:

$0.04 < A/fO < 0.2$         (1)

$0.35 < B/fO < 0.5$         (2)

$TL/fO > 1.1$         (3)

A: the distance between the blur-correcting lens group and an optical element on the object-side of the blur-correcting lens group;

B: the distance between the blur-correcting lens group and an optical element on the operator's eye-side of the blur-correcting lens group;

FO: the focal length of the objective optical system; and

TL: the distance between the object-side surface of the most object-side lens element in the objective optical system and the image plane thereof.

3 Claims, 12 Drawing Sheets

IMAGE-BLUR CORRECTING OPTICAL SYSTEM FOR A VIEWING OPTICAL APPARATUS

BACKGROUND OF THE INVENTION

1. Field of the Invention

The present invention relates to an image-blur correcting optical system suitable for a viewing optical apparatus with an image-blur correcting function.

2. Description of the Related Art

As an image-blur correcting optical system for a viewing optical apparatus, such as a binocular, a telescope and the like, the optical system, for example, disclosed in Japanese Unexamined Patent Publication No. Hei-10-186228 is known in the art. The image-blur correcting optical system disclosed therein is provided in an objective optical system constituted by a front lens group and a rear lens group, in this order from the object. An image-blur correction is conducted by moving the negative rear lens group in a direction substantially perpendicular to the optical axis. This image-blur correcting optical system is designed to be used in a viewing optical apparatus, such as a spotting scope, having a very long objective optical system. Therefore in order to provide an image-blur correcting apparatus (e.g., an actuator) in the objective optical system, a sufficient space for that purpose is secured therein. Further, since a negative lens element is used as an image-blur correcting lens element to shorten the objective optical system, the overall length thereof is less than or equal to the focal length of the objective optical system, which contributes to miniaturization of a viewing optical apparatus. Due to the above arrangement of the objective optical system, the spotting scope can be made enough short; however, the same arrangement is still considered to be too long for an objective optical system for a binocular or the like. Accordingly, the above image-blur correcting optical system cannot be applied to a viewing optical apparatus, such as a binocular or the like, in which the overall length of the objective optical system is inherently short and no sufficient space is maintained for an image-blur correcting apparatus.

SUMMARY OF THE INVENTION

It is an object of the present invention to provide a miniaturized and light (less heavier) image-blur correcting optical system which has high optical performance, and can provide a space for an image-blur correcting apparatus in a viewing optical apparatus in which the overall length of the objective optical system is short.

In order to achieve the above-mentioned object, there is provided an image-blur correcting optical system including an objective optical system, an image-erecting optical system, and an eyepiece optical system, in this order from the object. The objective optical system includes a front lens group and a rear lens group, in this order from the object, and the front lens group is made immoveable. The image-blur correcting optical system includes a positive blur-correcting lens group constituted by the rear lens group which is arranged to move in a direction perpendicular to the optical axis, in accordance with the magnitude of a shake imposed on the optical system. The image-blur correcting optical system satisfies the following conditions:

$$0.04 < A/fO < 0.2 \quad (1)$$

$$0.35 < B/fO < 0.5 \quad (2)$$

$$TL/fO > 1.1 \quad (3)$$

wherein

A designates the distance between the blur-correcting lens group (the rear lens group) and an optical element which is positioned on the object-side of the blur-correcting lens group;

B designates the distance between the blur-correcting lens group and an optical element which is positioned on the operator's eye-side (hereinafter, eyepiece-side) of the blur-correcting lens group;

fO designates the focal length of the entire objective optical system; and

TL designates the distance between the object-side surface of the most object-side lens element in the objective optical system and the image plane thereof. The image plane is depicted by the dashed line 15 of FIG. 13.

Due to this arrangement, even in a miniaturized viewing optical apparatus, such as a binocular, which has the short objective optical system, a space for an image-blur correcting apparatus can be secured while suitable optical performance is maintained.

In order to correct aberrations effectively through the objective optical system, the following condition is preferably satisfied:

$$0.2 < \phi 1/\phi 2 < 0.8 \quad (4)$$

wherein $\phi 1$ designates the power of the front lens group of the objective optical system; and $\phi 2$ designates the power of the rear lens group of the objective optical system.

Furthermore, in order to obtain suitable sensitivity on the movement of the blur-correcting lens group, the objective optical system preferably satisfies the following condition:

$$0.5 < |\tan 1°/(\phi 0 - \phi 1)| < 5 \quad (5)$$

wherein $\phi 0$ designates the power of the entire objective optical system.

The present disclosure relates to subject matter contained in Japanese Patent Application No.Hei-11-166501 (filed on Jun. 14, 1999) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 13:
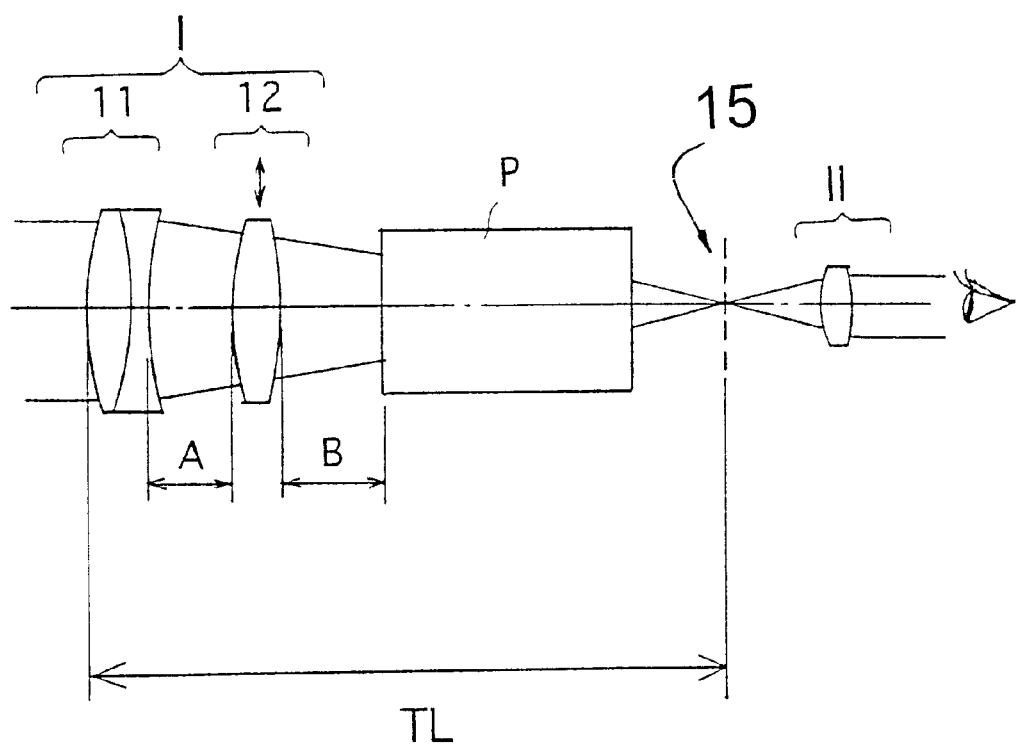
FIG. 13 shows a schematic lens arrangement of the image-blur correcting optical system, and the distance between 'A' and 'B' defined in conditions (1) and (2), according to the present invention.

As shown in FIG. 13, a viewing optical apparatus includes an objective optical system I, an image-erecting optical system P, and an eyepiece optical system II, in this order from the object. The objective optical system I includes a front lens group 11 and a rear lens group 12, in this order from the object. The front lens group 11 is made immoveable, while the rear lens group is formed as a positive blur-correcting lens group constituting an image-blur correcting optical system. More concretely, in order to correct blur, the blur-correcting lens group (the rear lens group 12) is arranged to move in a direction perpendicular to the optical axis, in accordance with the magnitude of a shake imposed on the viewing optical apparatus.

Figure 14:
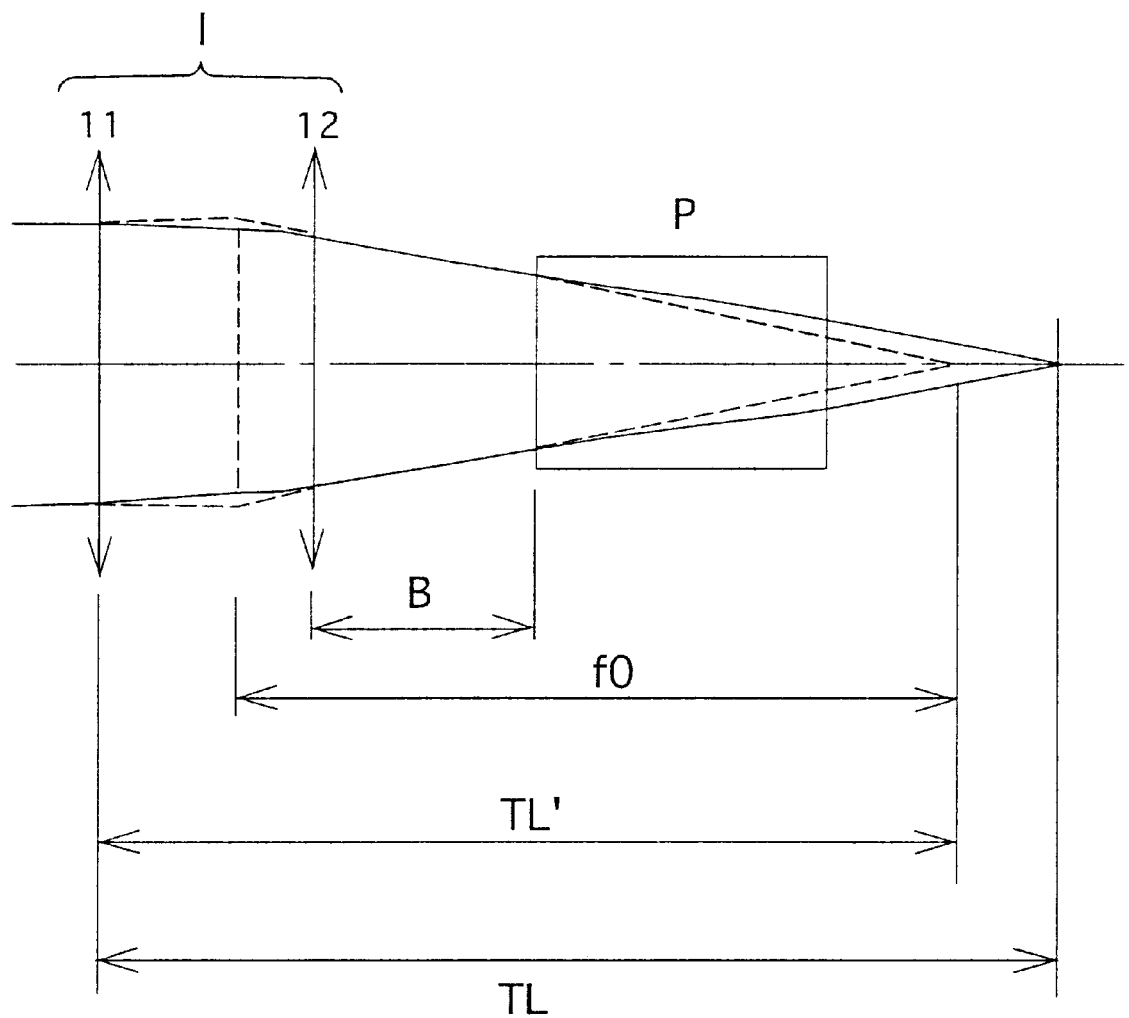
FIG. 14 shows the relationship between the overall length of the objective optical system and the focal length thereof; a part of the objective optical system constitutes the image-blur correcting optical system according to the present invention.
Figure 15:
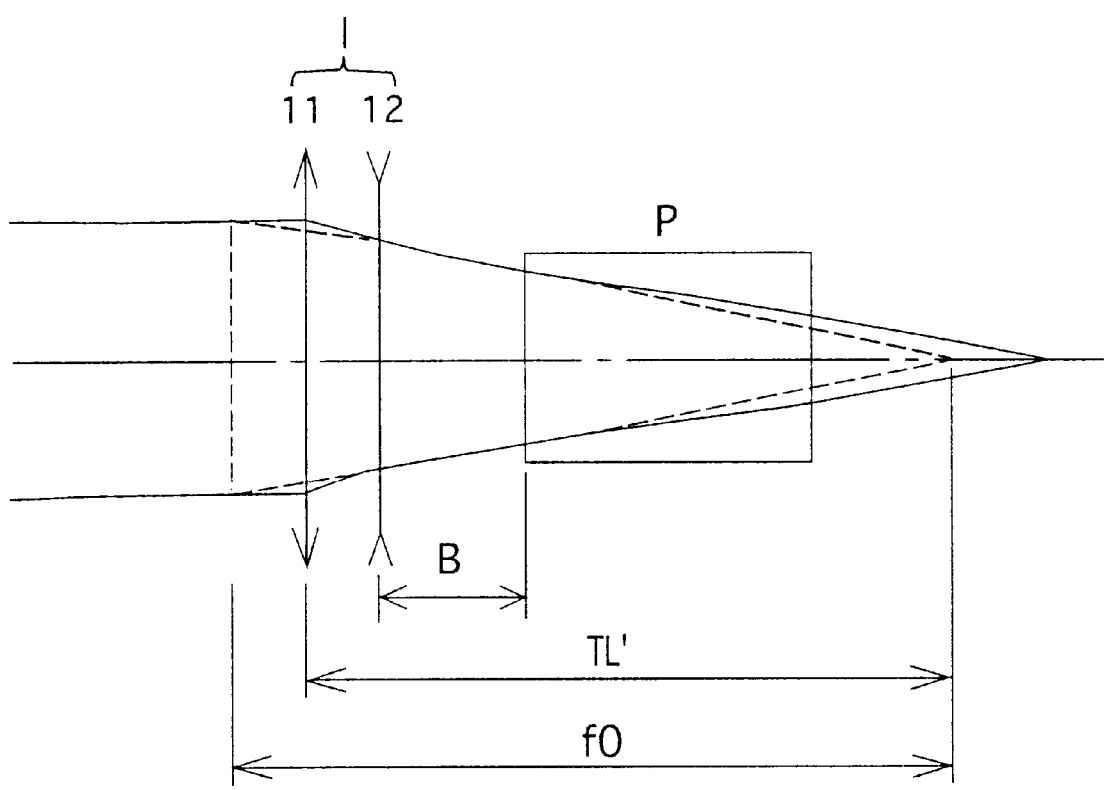
FIG. 15 shows the relationship between the overall length of the conventional objective optical system and the focal length thereof.

In the case where the rear lens group 12 (the blur-correcting lens group) has a positive power, the positive power of the front lens group 11 becomes weaker, so that the correcting of aberrations is easier. As a result, the structure of an optical system can be simplified, a tolerance on production can be made larger, i.e., the requirement of tolerance can be less strict, and precision thereof can be enhanced. Further, for the purpose of comparison, FIGS. 14 and 15 show the blur-correcting lens group 12 respectively having a positive power and a negative power. In the case where the positive blur-correcting lens group 12 (FIG. 14) is provided, the distance B between the blur-correcting lens group 12 and the image-erecting optical system P (i.e., an optical element on the eyepiece-side with respect to the blur-correcting lens group 12) can be made longer, compared with the case where the negative blur-correcting lens group 12 (FIG. 15) is provided. In other words, by providing the positive blur-correcting lens group 12 (FIG. 14), the overall length TL' (the equivalent air thickness of the overall length of the objective optical system I) of the objective optical system I is made longer than the focal length fO thereof, so that the distance B becomes longer, compared with the case where the negative blur-correcting lens group 12 is used.

Conditions (1) to (3) are for providing a space in which an image-blur correcting apparatus, such as an actuator or the like, is positioned.

Condition (1) specifies the distance between the blur-correcting lens group and an optical element positioned on the object-side of the blur-correcting lens group.

If A/fO exceeds the lower limit of condition (1), it becomes difficult to maintain the space to position a driving system for the blur-correcting lens group.

If A/fO exceeds the upper limit of condition (1), there are the following disadvantages:
 (i) the overall length of the objective optical system becomes too long;
 (ii) the size of the image-erecting optical system becomes larger, since the blur-correcting lens group is positioned too close to the image-erecting optical system;
 (iii) eclipse generated by the image-erecting optical system becomes noticeable; and
 (iv) the power of the blur-correcting lens group becomes too weak, so that the correcting of aberrations, in particular, spherical aberration and come, becomes difficult.

Condition (2) specifies the distance between the blur-correcting lens group and an optical element positioned on the eyepiece-side of the blur-correcting lens group.

If B/fO exceeds the lower limit of condition (2), there are the following disadvantages:
 (i) it becomes difficult to maintain the space to position the driving system for the blur-correcting lens group;
 (ii) the size of the image-erecting optical system becomes larger;
 (iii) eclipse generated by the image-erecting optical system becomes noticeable; and
 (iv) the power of the blur-correcting lens group becomes too weak, so that the correcting of aberrations, in particular, spherical aberration and come, becomes difficult.

If B/fO exceeds the upper limit of condition (2), the entire viewing optical apparatus becomes larger.

Condition (3) specifies the overall length of the objective optical system.

If TL/fO exceeds the lower limit of condition (3), it becomes difficult to maintain the space to position the driving system for the blur-correcting lens group.

Condition (4) is for effectively correcting aberrations through the objective optical system. With respect to the power of the entire objective optical system, the weaker the power of the front lens group becomes, at the same time, the stronger the power of the rear lens group becomes, the more advantageous it is for the correcting of aberrations.

If ∅1/∅2 exceeds the lower limit of condition (4), the power of the front lens group becomes relatively too weak, so that the overall length of the objective optical system is made longer, and the diameter of the rear lens group becomes larger.

If ∅1/∅2 exceeds the upper limit of condition (4), the power of the front lens group becomes relatively stronger with respect to that of the rear lens group, so that it becomes difficult to correct spherical aberration and come in the objective optical system.

Condition (5) specifies the amount of movement (mm) of the blur-correcting lens group in order to correct a blur angle of 1°.

If $|\tan 1°/(\emptyset 0 - \emptyset 1)|$ exceeds the lower limit of condition (5), sensitivity on the movement of the blur-correcting lens group becomes too high, so that the control thereof becomes difficult.

If $|\tan 1°/(\emptyset 0 - \emptyset 1)|$ exceeds the upper limit of condition (5), sensitivity on the movement of the blur-correcting lens group becomes too low, so that the amount of movement is larger. As a result, the viewing optical apparatus has to be made larger, or a correctable blur angle decreases.

Specific numerical examples will herein be discussed. In the tables and diagrams, r designates the radius of curvature, d designates the lens thickness or space between lens surfaces, $N_d$ designates the refractive index of the d line, and υ designates the Abbe number. In the diagrams of chromatic aberration represented by spherical aberration, the solid line and the two types of dotted lines respectively indicate spherical aberration with respect to the d, g and C lines, and ER designates the diameter of the exit pupil (mm). In the diagrams of lateral chromatic aberration, the solid line and the two types of dotted lines respectively indicate magnification with respect to the d, g and C lines, and β designates the angle formed by the optical axis and an emitting light ray. Also, in the diagrams of astigmatism, S designates the sagittal image, M designates the meridional image, and β designates the angle formed by the optical axis and an emitting light ray.

In addition to the above, an aspherical surface which is symmetrical with respect to the optical axis is defined as follows:

$$x = Ch^2/\{1+[1-(1+K)C^2h^2]^{1/2}\} + A4h^4 + A6h^6 + A8h^8 + A10h^{10} \ldots;$$

wherein:

x designates a distance from a tangent plane of an aspherical vertex;

C designates a curvature of the aspherical vertex (1/r);

h designates a distance from the optical axis;

K designates the conic coefficient;

A4 designates a fourth-order aspherical coefficient;

A6 designates a sixth-order aspherical coefficient;

A8 designates an eighth-order aspherical coefficient; and

A10 designates a tenth-order aspherical coefficient;

[Embodiment 1]

Figure 1:
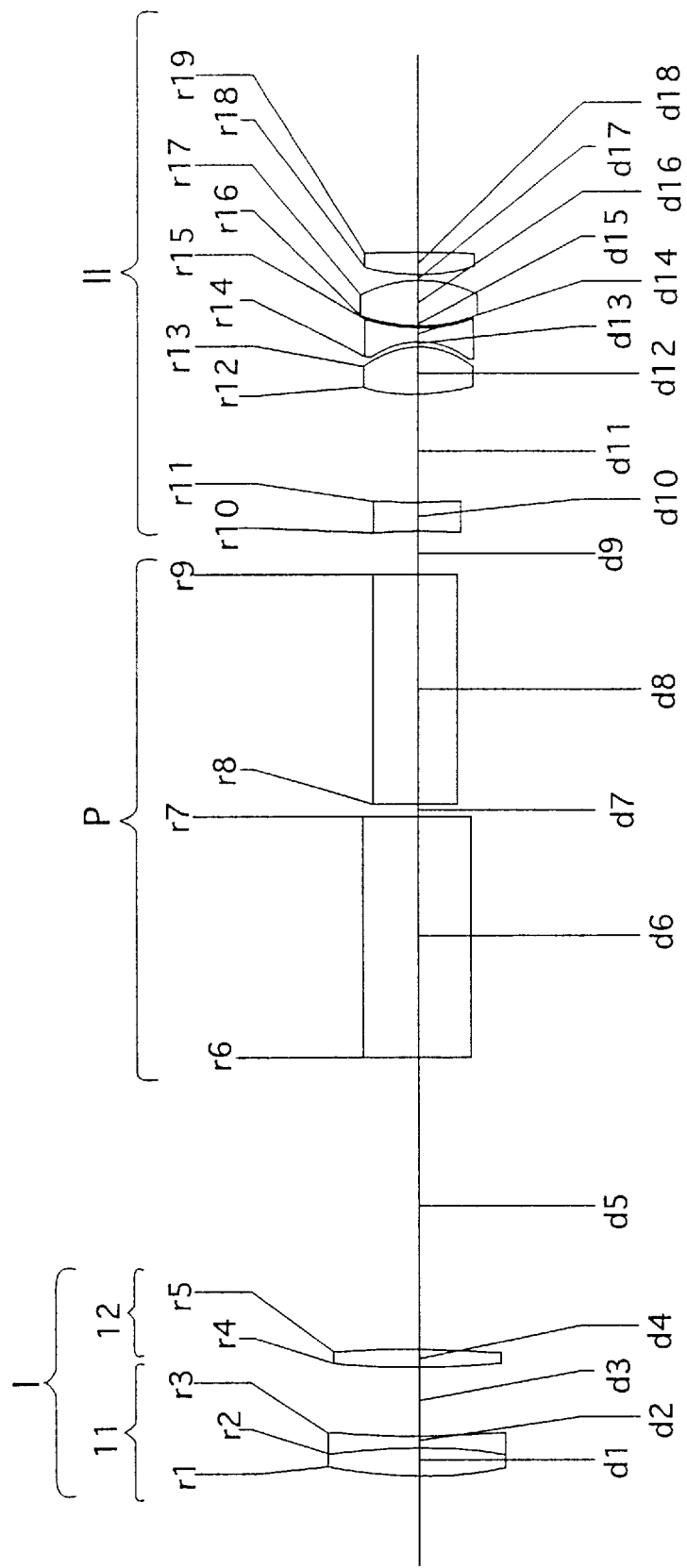
FIG. 1 is a lens arrangement of a viewing optical apparatus (an image-blur correcting telescope) having an image-blur correcting optical system, according to a first embodiment of the present invention.
Figure 2:
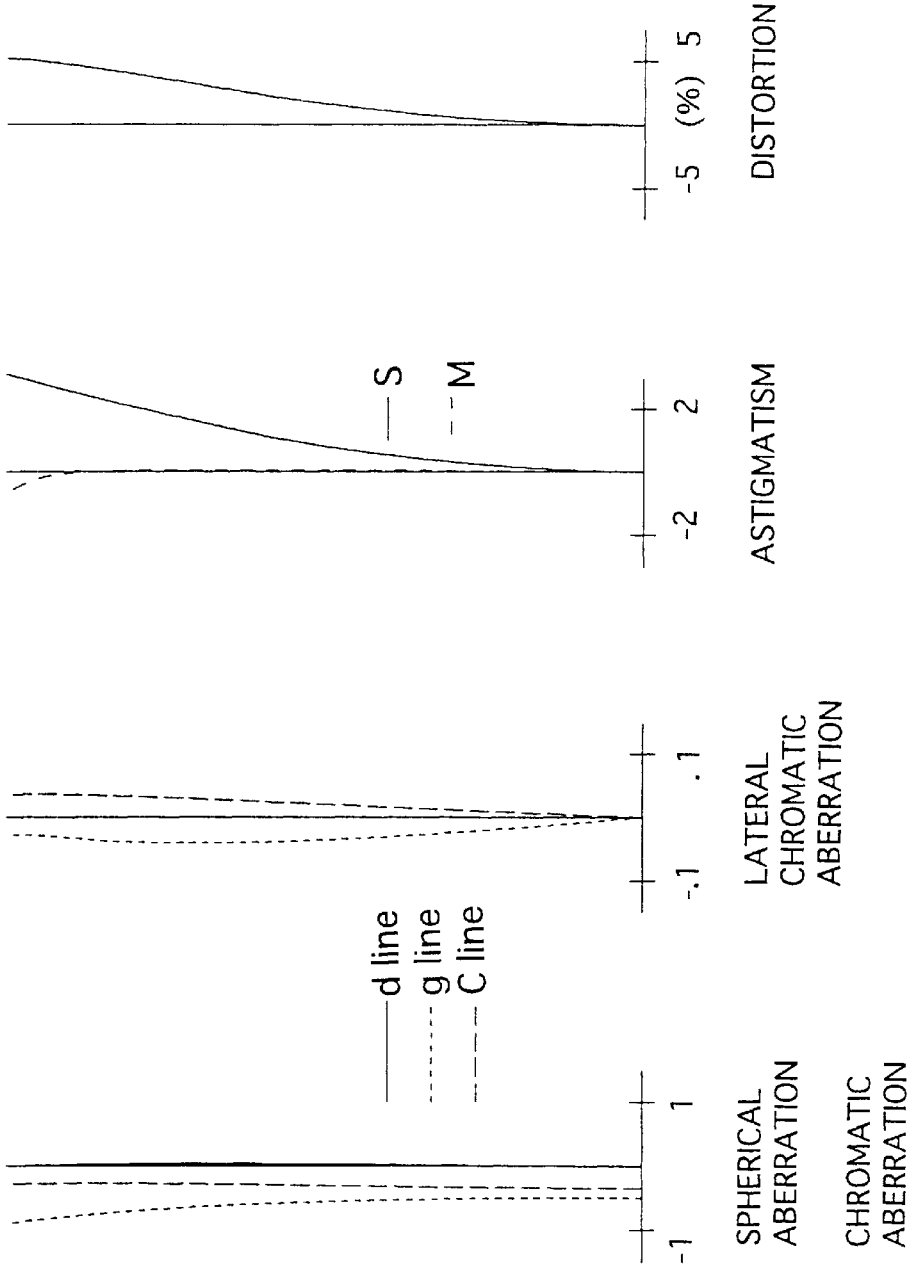
FIGS. 2A, 2B, 2C and 2D are aberration diagrams of the optical system shown in FIG 1.
Figure 3:
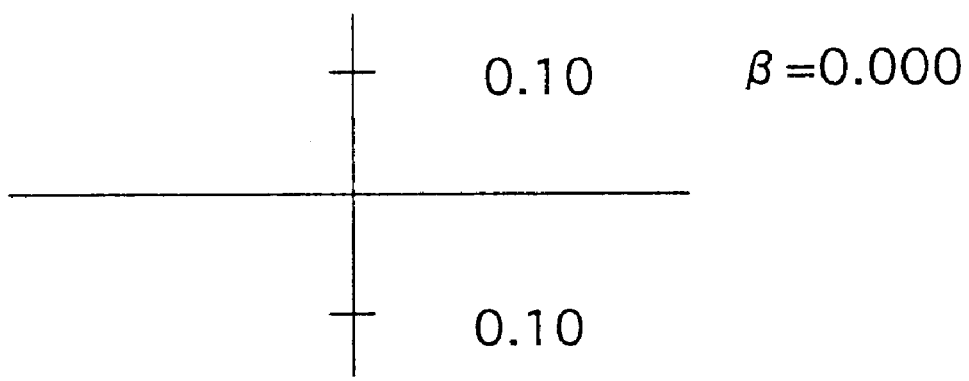
FIG. 3 shows axial coma before blur correction, i.e., the image-blur correcting optical system of FIG. 1 is not decentered for blur-correction.
Figure 4:
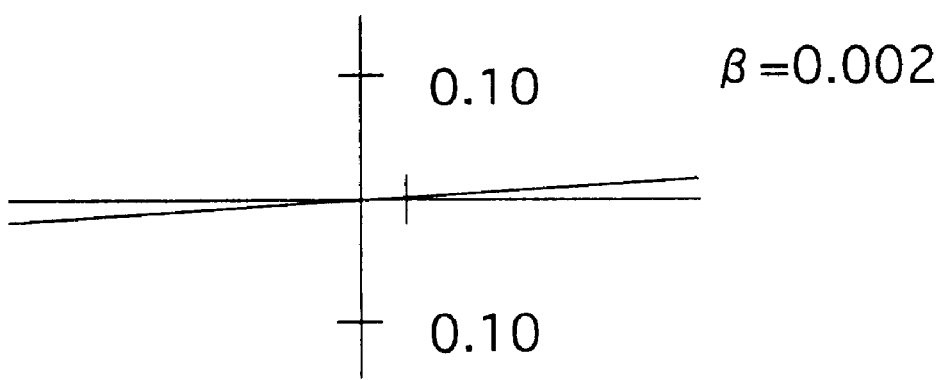
FIG. 4 shows axial coma when the image-blur correcting optical system of FIG. 1 is decentered to correct a blur angle, due to a shake, of 0.75° occurred in the entire viewing optical apparatus.

FIGS. 1 through 4 show the first embodiment in which the image-blur correcting optical system is applied to an image-blur correcting telescope (a viewing optical apparatus). As shown in FIG. 1, the optical system of the image-blur correcting telescope includes the objective optical system I, the image-erecting optical system P and the eyepiece optical system II, in this order from the object. The objective optical system I includes the front lens group 11 and the rear lens group 12, in this order from the object. The eyepiece optical system II includes a negative lens element, a positive lens element, a negative lens element, a positive lens element and a positive lens element, in this order from the object. Table 1 shows the numerical data thereof. FIGS. 2A through 2D are aberration diagrams of the optical system shown in FIG. 1. FIG. 3 shows axial coma before blur correction, i.e., the image-blur correcting optical system of FIG. 1 is not decentered for blur correction. FIG. 4 shows axial coma when the image-blur correcting optical system of FIG. 1 is decentered to correct a blur angle, due to a shake, of 0.75° occurred in the entire image-blur correcting telescope. In this case, the blur-correcting lens group 12 is decentered by 2.5 mm.

TABLE 1

| Surface No. | r | d | $N_d$ | υ |
|---|---|---|---|---|
| 1 | 72.950 | 3.700 | 1.51633 | 64.1 |
| 2 | −72.950 | 1.800 | 1.62004 | 36.3 |
| 3 | 348.158 | 9.180 | — | — |
| 4 | 126.664 | 2.300 | 1.49176 | 57.4 |
| 5* | −289.338 | 40.000 | — | — |
| 6 | ∞ | 34.000 | 1.56883 | 56.3 |
| 7 | ∞ | 1.500 | — | — |
| 8 | ∞ | 32.000 | 1.56883 | 56.3 |
| 9 | ∞ | 5.800 | — | — |
| 10 | −93.620 | 4.000 | 1.49176 | 57.4 |
| 11* | 93.620 | 14.830 | — | — |
| 12 | 23.936 | 6.770 | 1.49176 | 57.4 |
| 13* | −10.075 | 0.700 | — | — |
| 14 | −11.190 | 2.000 | 1.58547 | 29.9 |
| 15 | 25.294 | 0.200 | — | — |
| 16 | 24.157 | 6.200 | 1.49176 | 57.4 |
| 17 | −15.260 | 0.500 | — | — |
| 18 | 22.703 | 3.500 | 1.60311 | 60.7 |
| 19 | −75.123 | — | — | — |

*designates the aspherical surface which is rotationally symmetrical with respect to the optical axis.

Aspherical surface data (the aspherical surface coefficients not indicated are zero (0.00)):

| Surface No. | K | A4 |
|---|---|---|
| 5 | 0.00 | 0.1738 × 10−6 |
| 11 | 0.00 | −0.1200 × 10−4 |
| 13 | −1.00 | −0.4600 × 10−5 |

[Embodiment 2]

Figure 5:
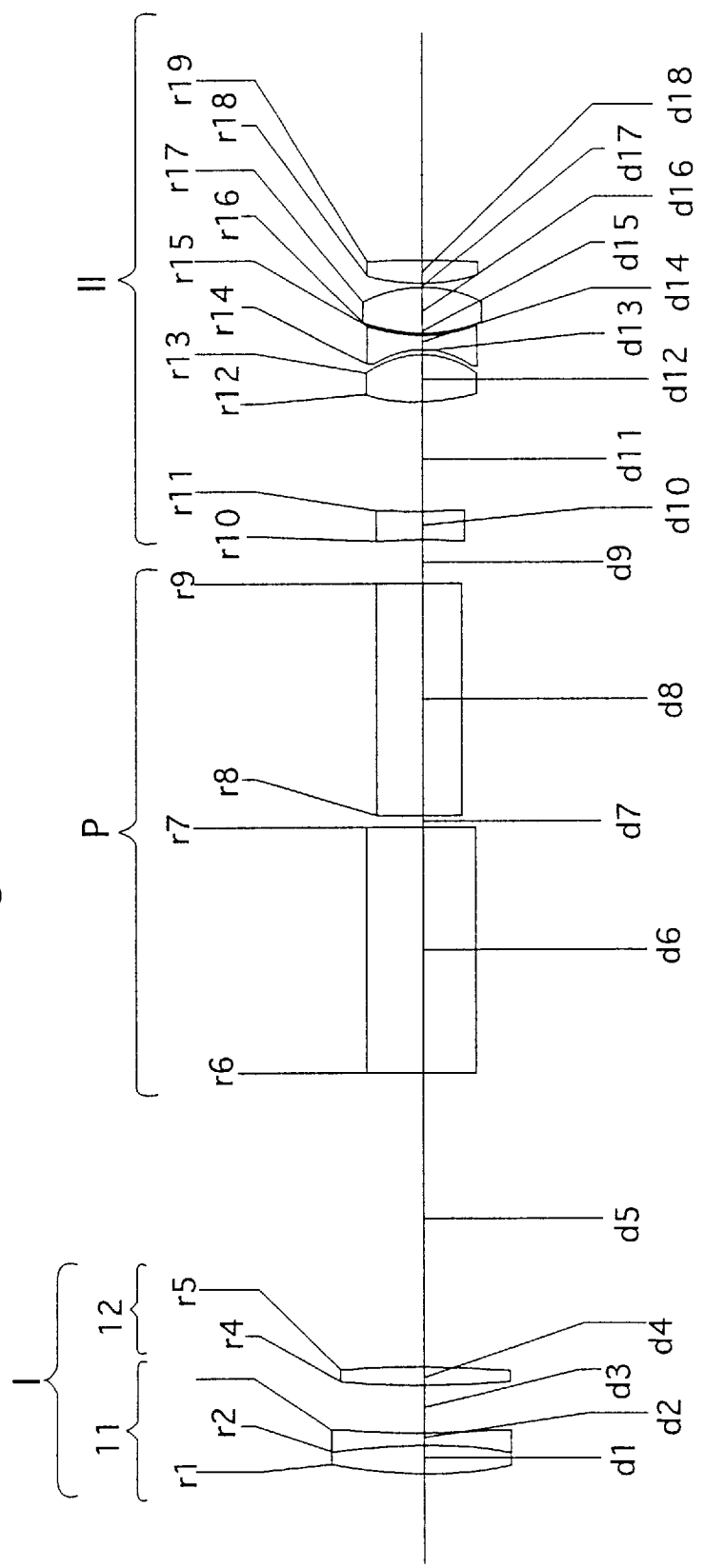
FIG. 5 is a lens arrangement of a viewing optical apparatus (an image-blur correcting telescope) having an image-blur correcting optical system, according to a second embodiment of the present invention.
Figure 6:
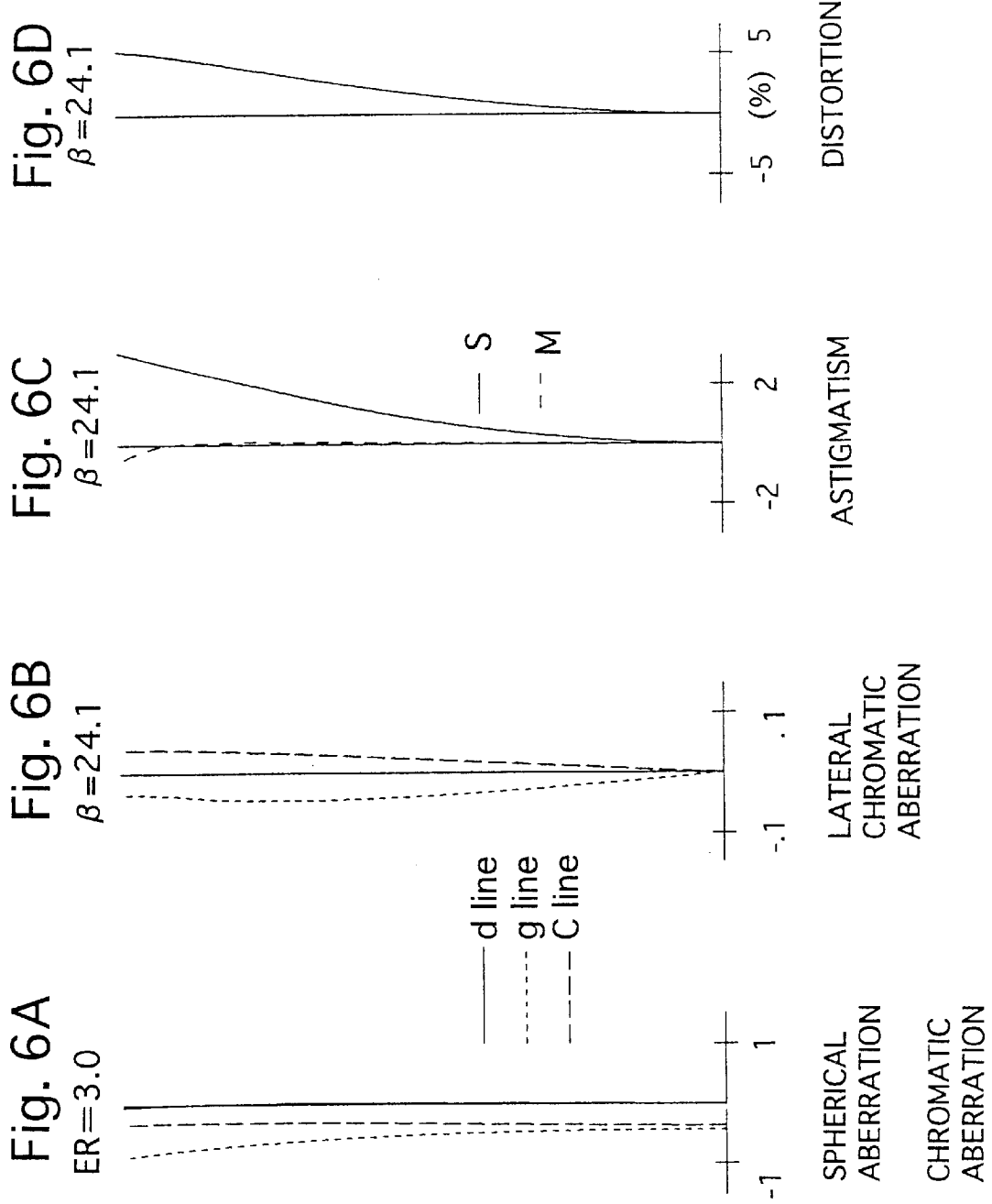
FIGS. 6A, 6B, 6C and 6D are aberration diagrams of the optical system shown in FIG. 5.
Figure 7:
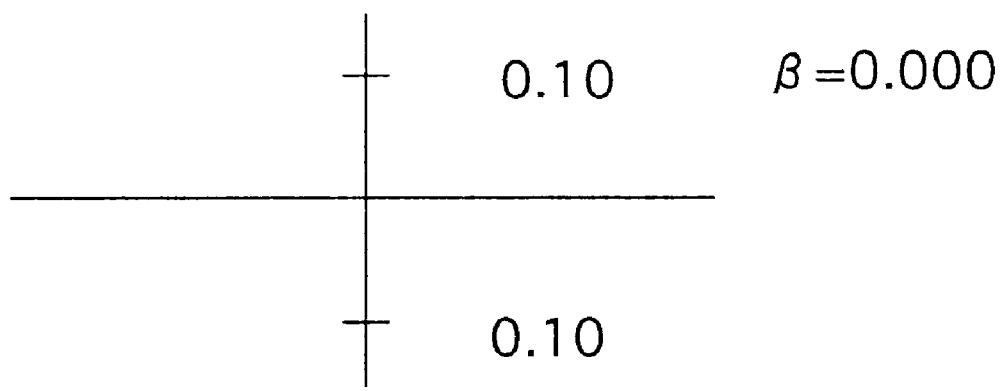
FIG. 7 shows axial coma before blur correction, i.e., the image-blur correcting optical system of FIG. 5 is not displaced for blur-correction.
Figure 8:
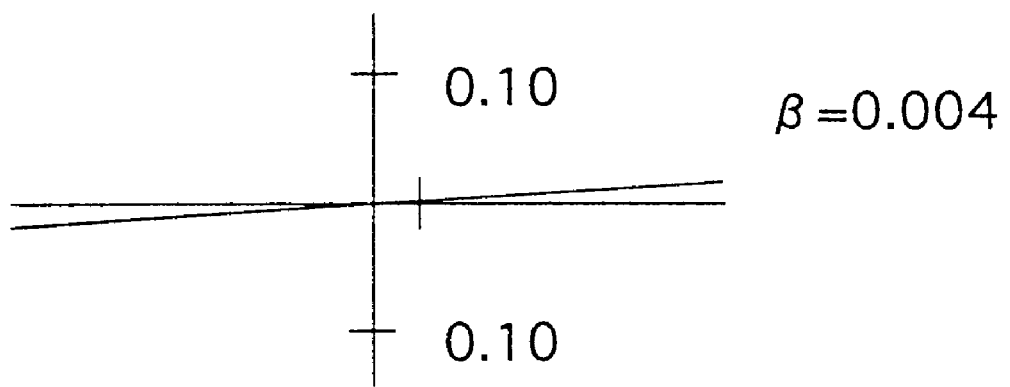
FIG. 8 shows axial coma when the image-blur correcting optical system of FIG. 5 is decentered to correct a blur angle, due to a shake, of 0.75° occurred in the entire viewing optical apparatus.

FIGS. 5 through 8 show the second embodiment in which the image-blur correcting optical system is applied to an image-blur correcting telescope (a viewing optical apparatus). FIG. 5 is the lens arrangement of the image-blur correcting telescope. Table 2 shows the numerical data thereof. The basic lens arrangement is the same as the first embodiment. FIGS. 6A through 6D are aberration diagrams of the optical system shown in FIG. 5. FIG. 7 shows axial coma before blur correction, i.e., the image-blur correcting optical system of FIG. 1 is not decentered for blur correction. FIG. 8 shows axial coma when the image-blur correcting optical system of FIG. 1 is decentered to correct a blur angle, due to a shake, of 0.75° occurred in the entire image-blur correcting telescope. In this case, the blur-correcting lens group 12 is decentered by 2.5 mm.

TABLE 2

| Surface No. | r | d | $N_d$ | υ |
|---|---|---|---|---|
| 1 | 72.303 | 3.800 | 1.51633 | 64.1 |
| 2 | −72.303 | 2.000 | 1.62004 | 36.3 |

TABLE 2-continued

| Surface No. | r | d | $N_d$ | v |
|---|---|---|---|---|
| 3 | 348.158 | 6.000 | — | — |
| 4 | 126.500 | 2.400 | 1.49176 | 57.4 |
| 5* | −301.001 | 40.490 | — | — |
| 6 | ∞ | 34.000 | 1.56883 | 56.3 |
| 7 | ∞ | 1.500 | — | — |
| 8 | ∞ | 32.000 | 1.56883 | 56.3 |
| 9 | ∞ | 5.800 | — | — |
| 10 | −93.620 | 4.000 | 1.49176 | 57.4 |
| 11* | 93.620 | 14.830 | — | — |
| 12 | 23.936 | 6.770 | 1.49176 | 57.4 |
| 13* | −10.075 | 0.700 | — | — |
| 14 | −11.190 | 2.000 | 1.58547 | 29.9 |
| 15 | 25.294 | 0.200 | — | — |
| 16 | 24.157 | 6.200 | 1.49176 | 57.4 |
| 17 | −15.260 | 0.500 | — | — |
| 18 | 22.703 | 3.500 | 1.60311 | 60.7 |
| 19 | −75.123 | — | — | — |

*designates the aspherical surface which is rotationally symmetrical with respect to the optical axis.

Aspherical surface data (the aspherical surface coefficients not indicated are zero (0.00)):

| Surface No. | K | A4 |
|---|---|---|
| 5 | 0.00 | 0.1687 × 10−6 |
| 11 | 0.00 | −0.1200 × 10−4 |
| 13 | −1.00 | −0.4600 × 10−5 |

[Embodiment 3]

Figure 9:
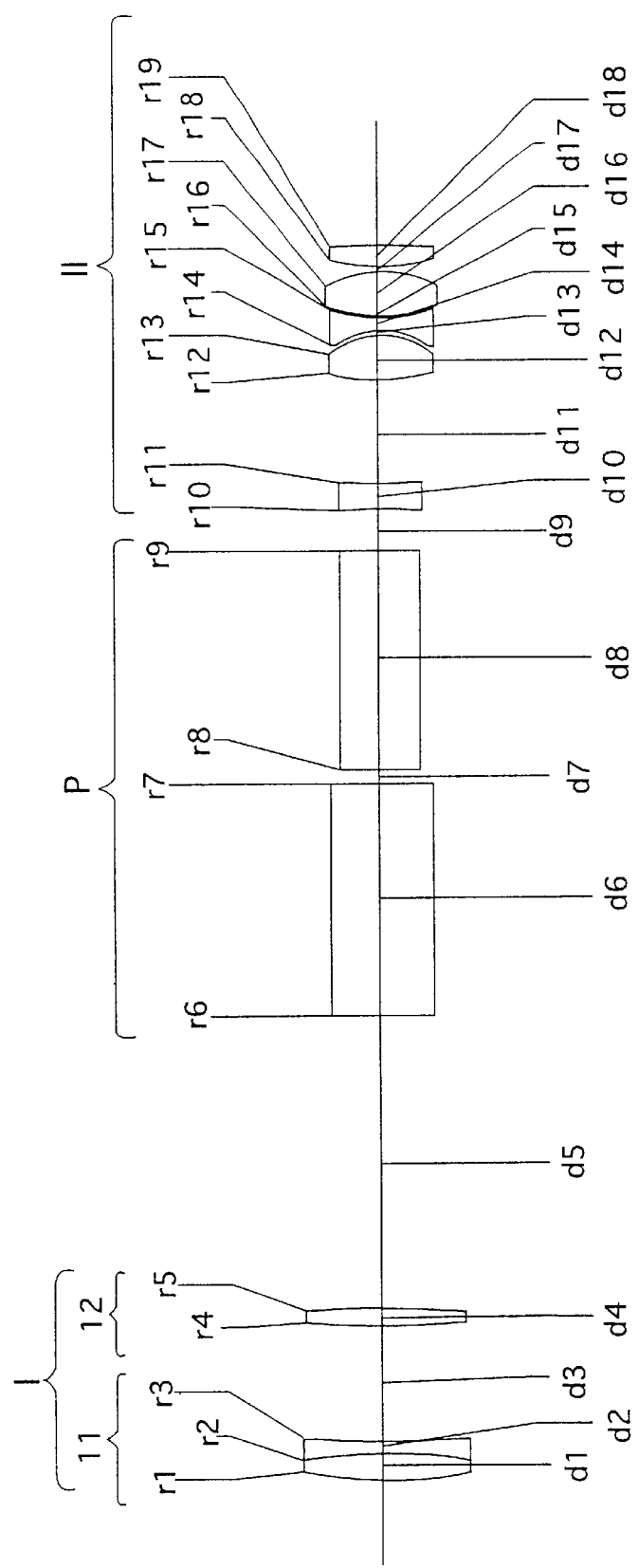
FIG. 9 is a lens arrangement of a viewing optical apparatus (an image-blur correcting telescope) having an image-blur correcting optical system, according to a third embodiment of the present invention.
Figure 10:
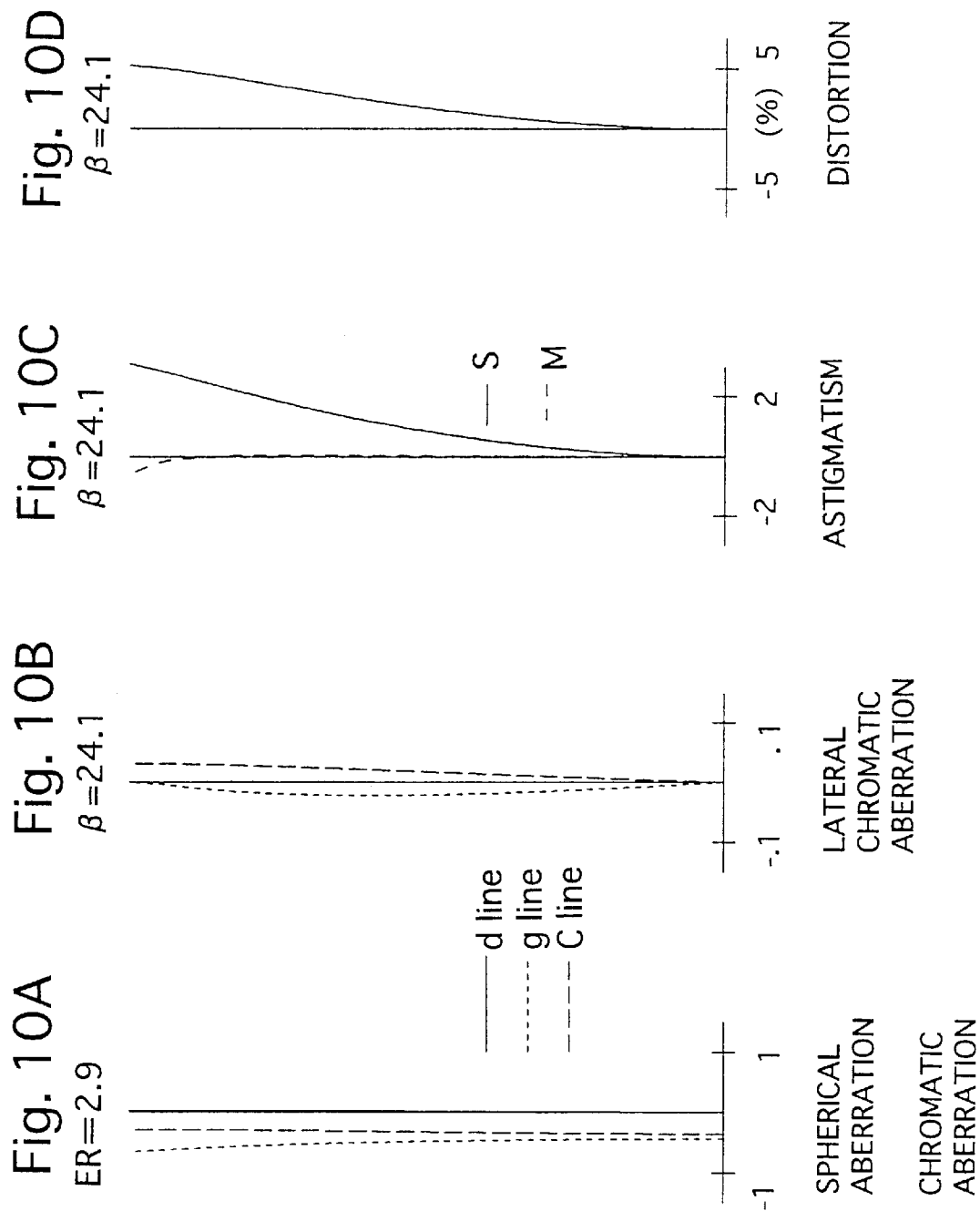
FIGS. 10A, 10B, 10C and 10D are aberration diagrams of the optical system shown in FIG. 9.
Figure 11:
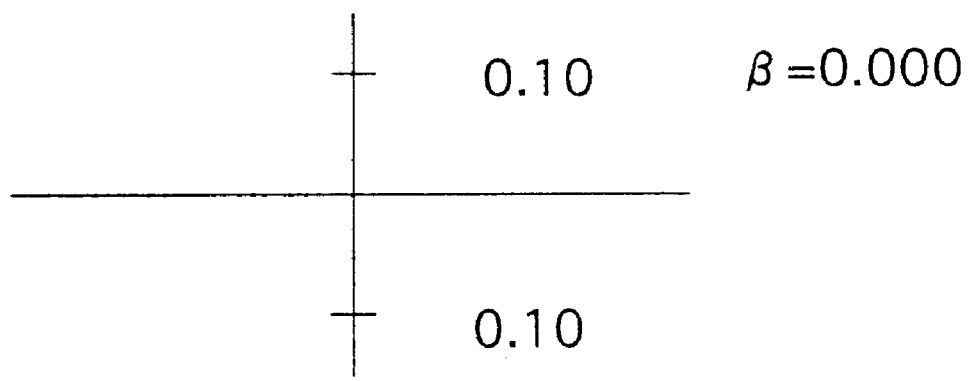
FIG. 11 shows axial coma before blur correction, i.e., the image-blur correcting optical system of FIG. 9 is not displaced for blur-correction.
Figure 12:
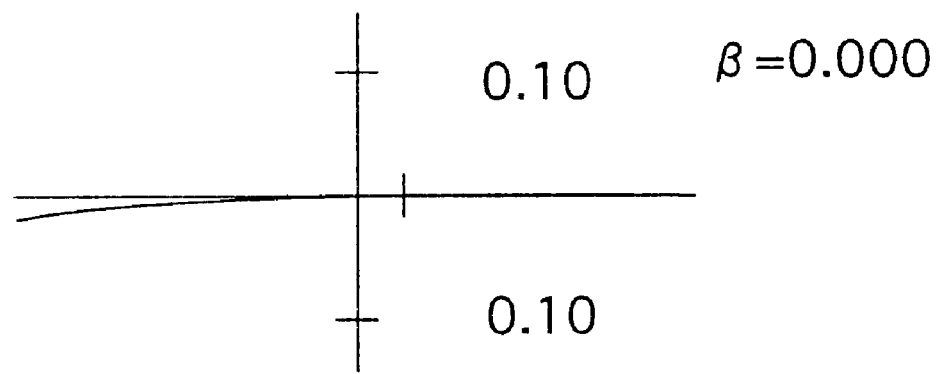
FIG. 12 shows axial coma when the image-blur correcting optical system of FIG. 9 is decentered to correct a blur angle, due to a shake, of 1° occurred in the entire viewing optical apparatus.

FIGS. 9 through 12 show the third embodiment in which the image-blur correcting optical system is applied to an image-blur correcting telescope (a viewing optical apparatus). FIG. 9 is the lens arrangement of the image-blur correcting telescope. Table 3 shows the numerical data thereof. The basic lens arrangement is the same as the first embodiment. FIGS. 10A through 10D are aberration diagrams of the optical system shown in FIG. 9. FIG. 11 shows axial coma before blur correction, i.e., the image-blur correcting optical system of FIG. 9 is not decentered for blur correction. FIG. 12 shows axial coma when the image-blur correcting optical system of FIG. 9 is decentered to correct a blur angle, due to a shake, of 1° occurred in the entire image-blur correcting telescope. In this case, the blur-correcting lens group 12 is decentered by 2.5 mm.

TABLE 3

| Surface No. | r | d | $N_d$ | v |
|---|---|---|---|---|
| 1 | 84.318 | 3.500 | 1.51633 | 64.1 |
| 2 | −84.318 | 2.000 | 1.62004 | 36.3 |
| 3 | 211.464 | 16.000 | — | — |
| 4 | 91.916 | 2.600 | 1.49176 | 57.4 |
| 5* | −241.296 | 42.000 | — | — |
| 6 | ∞ | 34.000 | 1.56883 | 56.3 |
| 7 | ∞ | 2.000 | — | — |
| 8 | ∞ | 32.000 | 1.56883 | 56.3 |
| 9 | ∞ | 5.800 | — | — |
| 10 | −93.620 | 4.000 | 1.49176 | 57.4 |
| 11* | 93.620 | 14.830 | — | — |
| 12 | 23.936 | 6.770 | 1.49176 | 57.4 |
| 13* | −10.075 | 0.700 | — | — |
| 14 | −11.190 | 2.000 | 1.58547 | 29.9 |
| 15 | 25.294 | 0.200 | — | — |
| 16 | 24.157 | 6.200 | 1.49176 | 57.4 |

TABLE 3-continued

| Surface No. | r | d | $N_d$ | v |
|---|---|---|---|---|
| 17 | −15.260 | 0.500 | — | — |
| 18 | 22.703 | 3.500 | 1.60311 | 60.7 |
| 19 | −75.123 | — | — | — |

*designates the aspherical surface which is rotationally symmetrical with respect to the optical axis.

Aspherical surface data (the aspherical surface coefficients not indicated are zero (0.00)):

| Surface No. | K | A4 |
|---|---|---|
| 5 | 14.3 | 0.3700 × 10−6 |
| 11 | 0.00 | −0.1200 × 10−4 |
| 13 | −1.00 | −0.4600 × 10−5 |

The numerical values of each condition of each embodiment are shown in Table 4 below.

TABLE 4

| | Embodiment 1 | Embodiment 2 | Embodiment 3 |
|---|---|---|---|
| Condition (1) | 0.08 | 0.06 | 0.14 |
| Condition (2) | 0.37 | 0.37 | 0.38 |
| Condition (3) | 1.30 | 1.29 | 1.37 |
| Condition (4) | 0.71 | 0.73 | 0.Z8 |
| Condition (5) | 3.34 | 3.34 | 2.50 |

As can be understood from Table 4, each embodiment satisfies each condition. Furthermore, as can be understood from the aberration diagrams, the various aberrations are relatively well corrected.

According to the above description, a miniaturized, light (less heavier) and high-optical-performance image-blur correcting optical system, which can provide a space for an image-blur correcting apparatus in a viewing optical apparatus having the objective optical system of the short overall length, can be obtained.

What is claimed is:

1. An image-blur correcting optical system comprising an objective optical system, an image-erecting optical system, and an eyepiece optical system, in this order from an object;

wherein said objective optical system comprises a front lens group and a rear lens group, in this order from the object; and said front lens group being immoveable;

wherein said image-blur correcting optical system comprises a positive blur-correcting lens group constituted by said rear lens group which is arranged to move in a direction perpendicular to an optical axis, in accordance with a magnitude of a shake imposed on said optical system; and wherein said image-blur correcting optical system satisfies the following conditions:

$0.04 < A/fO < 0.2$ $0.35 < B/fO < 0.5$ $TL/fO > 1.1$ wherein

A designates a distance between said blur-correcting lens group and an optical element which is positioned on the object-side of said blur-correcting lens group;

B designates a distance between said blur-correcting lens group and an optical element which is positioned on the eyepiece-side of said blur-correcting lens group;

fO designates a focal length of the objective optical system; and

TL designates a distance between the object-side surface of the most object-side lens element in said objective optical system and an image plane of said objective optical system.

2. The image-blur correcting system according to claim 1, wherein said objective optical system satisfies the following condition:

$$0.2 < \phi 1/\phi 2 < 0.8$$

wherein $\phi 1$ designates a power of said front lens group of said objective optical system; and $\phi 2$ designates a power of said rear lens group of said objective optical system.

3. The image-blur correcting optical system according to claim 1, wherein said objective optical system satisfies the following condition:

$$0.5 < |\tan 1°/(\phi 0 - \phi 1)| < 5$$

wherein $\phi 0$ designates a power of the objective optical system; and $\phi 1$ designates a power of said front lens group of said objective optical system.

* * * * *